US012619384B2

(12) United States Patent
Agarwal

(10) Patent No.: US 12,619,384 B2
(45) Date of Patent: May 5, 2026

(54) DATA STORAGE DEVICE AND METHOD FOR ACCESS CONTROL BASED ON A STREAM IDENTIFIER OF A VIRTUAL FUNCTION

(71) Applicant: Sandisk Technologies, Inc., Milpitas, CA (US)

(72) Inventor: Leeladhar Agarwal, Fremont, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/653,045

(22) Filed: May 2, 2024

(65) Prior Publication Data

US 2025/0341984 A1     Nov. 6, 2025

(51) Int. Cl.
  *G06F 3/06*          (2006.01)
(52) U.S. Cl.
  CPC .......... *G06F 3/0659* (2013.01); *G06F 3/0622* (2013.01); *G06F 3/0662* (2013.01); *G06F 3/0673* (2013.01)
(58) Field of Classification Search
  CPC .... G06F 3/0659; G06F 3/0601; G06F 3/0602; G06F 3/0608; G06F 3/0644; G06F 3/066; G06F 3/0673
  See application file for complete search history.

(56) References Cited

U.S. PATENT DOCUMENTS

| | | | |
|---|---|---|---|
| 8,881,141 B2 | 11/2014 | Koch et al. | |
| 10,019,181 B2 | 7/2018 | Singh et al. | |
| 11,221,972 B1 | 1/2022 | Raman et al. | |
| 2013/0254368 A1* | 9/2013 | Guay .................. | G06F 9/45558 |
| | | | 709/223 |
| 2018/0307521 A1* | 10/2018 | Pinto ................... | G06F 9/45558 |
| 2022/0326979 A1 | 10/2022 | Dong et al. | |
| 2023/0004329 A1 | 1/2023 | Benisty | |
| 2023/0237184 A1* | 7/2023 | Shin .................... | G06F 12/0246 |
| | | | 726/26 |
| 2023/0409217 A1* | 12/2023 | Ghaly ................... | G06F 3/0679 |
| 2024/0311167 A1* | 9/2024 | Powell ................ | G06F 9/45558 |

* cited by examiner

*Primary Examiner* — Tracy A Warren
(74) *Attorney, Agent, or Firm* — Crowell & Moring LLP

(57) ABSTRACT

A data storage device with access control based on stream identifier for virtual environment is provided. In one embodiment, a method is provided that is performed in a host in communication with a data storage device comprising a memory. The method comprises identifying an available submission queue; deleting the submission queue; recreating the submission queue; assigning the virtual machine to a virtual function; assigning the recreated submission queue with the virtual function; and informing the data storage device that the recreated submission queue is attached to a stream identifier, wherein the stream identifier is associated with a virtual machine. Other embodiments are provided.

19 Claims, 7 Drawing Sheets

600

610

User Done Playing the Game

620

Administrative (OS Virtual Machine)

630

Detach Submission Queue from VM and Inform Data Storage Device

640

Submission Queue Available to Use for Next Game Request

DATA STORAGE DEVICE AND METHOD FOR ACCESS CONTROL BASED ON A STREAM IDENTIFIER OF A VIRTUAL FUNCTION

BACKGROUND

A single-root input/output virtualization (SR-IOV) interface is an extension to the Peripheral Component Interconnect Express (PCIe) specification and introduces the concept of physical functions (PF) and virtual functions. An SR-IOV access control feature is based on a namespace, and virtual function attachment is done to a namespace. A namespace refers to a collection of logical block addresses (LBAs) accessible to host software, and a namespace ID is an identifier used to provide access to a namespace. Virtual environmental isolation is achieved by namespace, where the administrative virtual machine attaches a virtual function to the namespace associated with a virtual machine. A virtual machine can read and write to the logical space assigned at the time of creating the namespace.

DETAILED DESCRIPTION

Figures 1A, 1B, 1C:
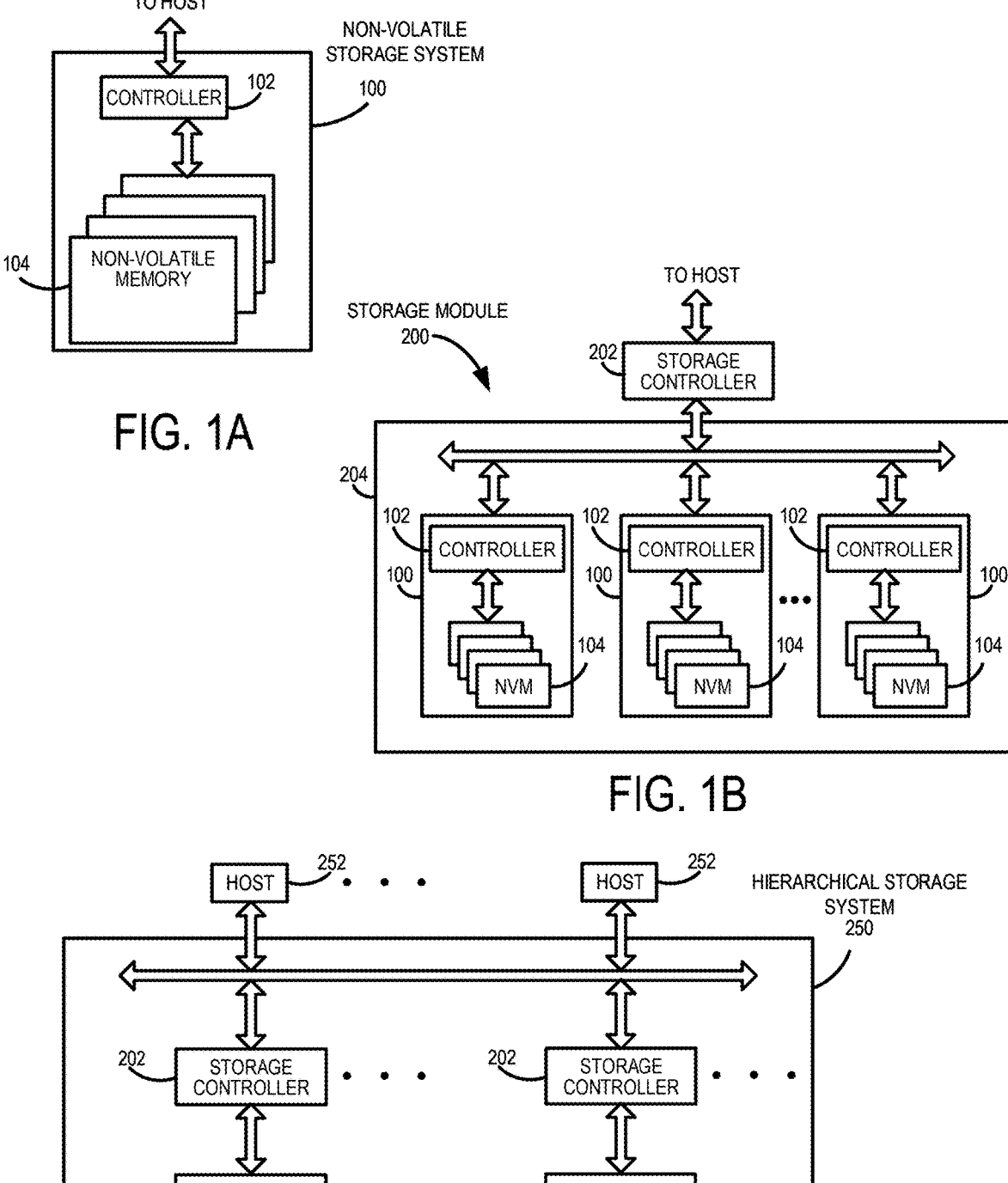
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

The following embodiments generally relate to a data storage device and method for access control based on a stream identifier of a virtual function. In one embodiment, a data storage device is provided comprising a memory and one or more processors. The one or more processors, individually or in combination, are configured to: retrieve a read request from a submission queue, wherein the submission queue was recreated from an available submission queue and assigned to a virtual function that is assigned to a virtual machine associated with a particular stream identifier; determine if the read request is associated with the particular stream identifier; in response to determining that the read request is associated with the particular stream identifier, process the read request; and in response to determining that the read request is not associated with the particular stream identifier, provide a message indicating that the read request will not be processed.

In some embodiments, assigning the submission queue to the virtual function provides access control without using single-root input/output virtualization (SR-IOV).

In some embodiments, assigning the submission queue to the virtual function provides access control without using a namespace.

In some embodiments, the submission queue was recreated by an administrative virtual machine.

In some embodiments, the one or more processors, individually or in combination, are further configured to receive a notification that the recreated submission queue was detached from the virtual machine.

In some embodiments, the particular stream identifier is associated with a gaming application.

In some embodiments, the particular stream identifier is associated with an automotive application.

In some embodiments, the one or more processors are part of a controller.

In some embodiments, the memory comprises a three-dimensional memory.

In another embodiment, a method is provided that is performed in a host in communication with a data storage device comprising a memory. The method comprises identifying an available submission queue; deleting the submission queue; recreating the submission queue; assigning the virtual machine to a virtual function; assigning the recreated submission queue with the virtual function; and informing the data storage device that the recreated submission queue is attached to a stream identifier, wherein the stream identifier is associated with a virtual machine.

In some embodiments, the method provides access control without using single-root input/output virtualization (SR-IOV).

In some embodiments, the method provides access control without using a namespace.

In some embodiments, the method is performed by an administrative virtual machine.

In some embodiments, the method further comprises detaching the recreated submission queue from the virtual machine.

In some embodiments, the method further comprises informing the data storage device that the recreated submission queue is detached from the virtual machine; and using the recreated submission queue for another application.

In some embodiments, the stream identifier is associated with a gaming application.

In some embodiments, the stream identifier is associate with an automotive application.

In some embodiments, the method is performed in one or more processors, individually or in combination.

In some embodiments, the memory comprises a three-dimensional memory.

In another embodiment, a data storage device is provided comprising: a memory; and means for associating a stream identifier of a virtual function to a dedicated submission queue to provide access control without use of a namespace.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
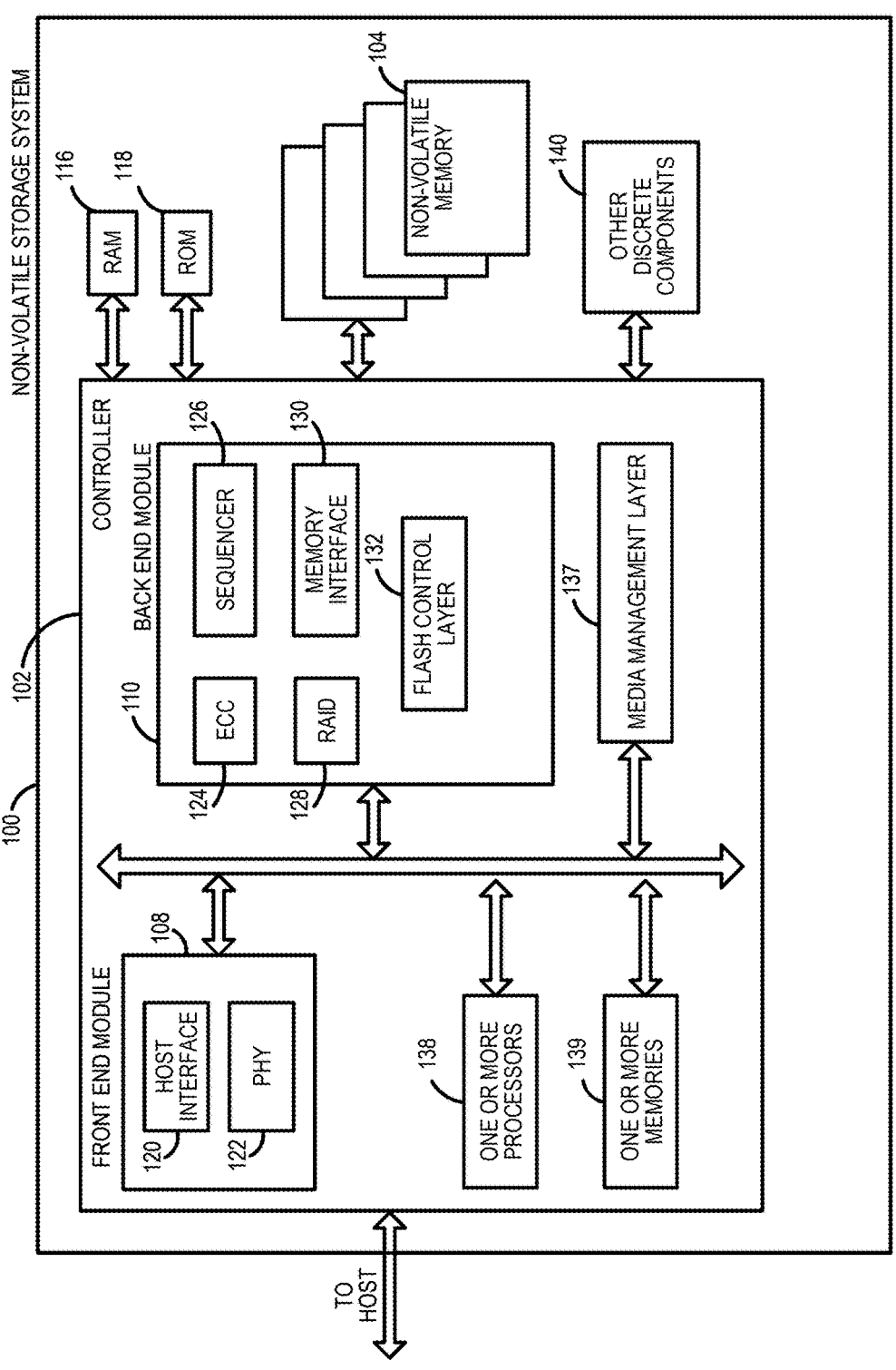
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/ or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
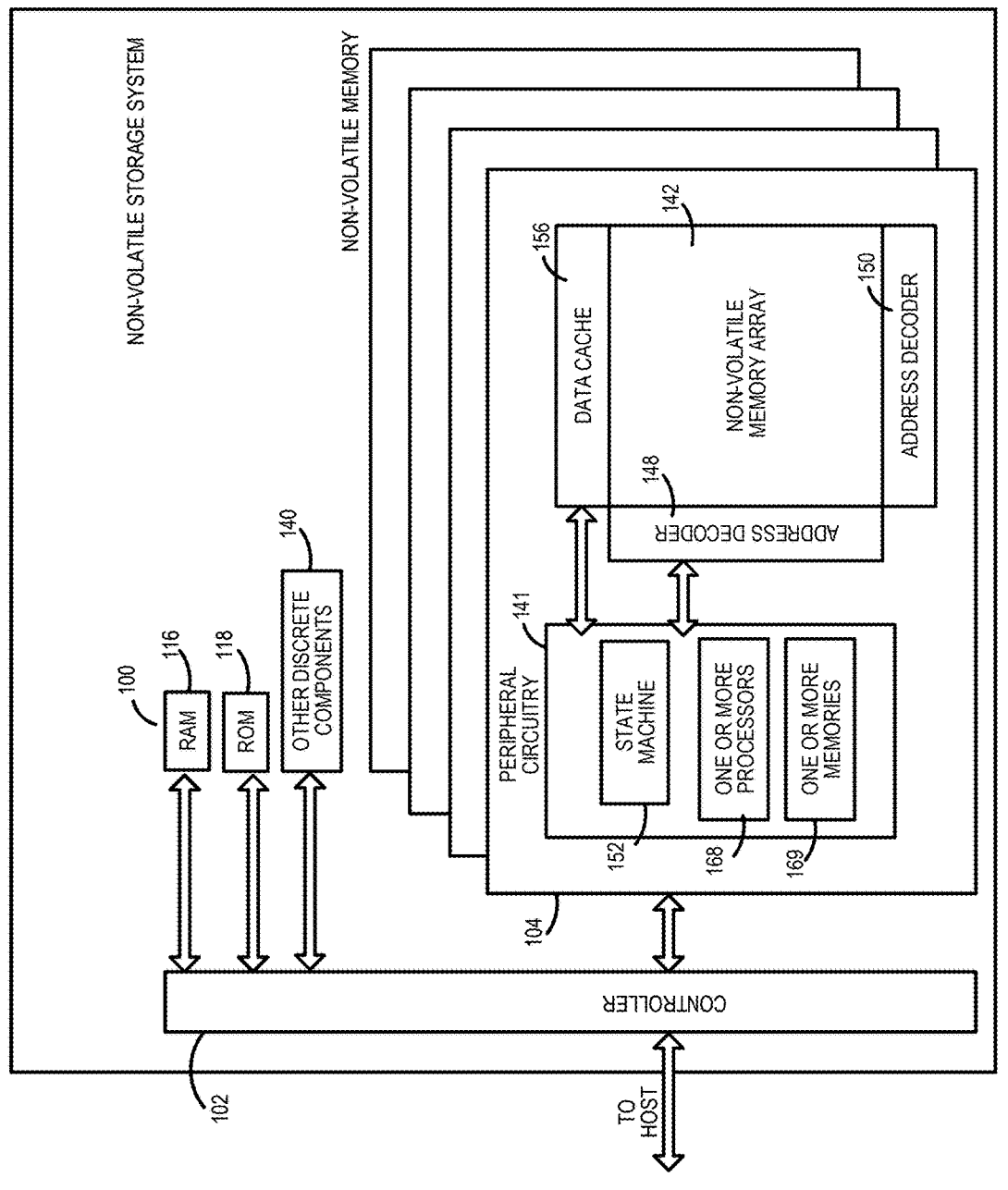
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
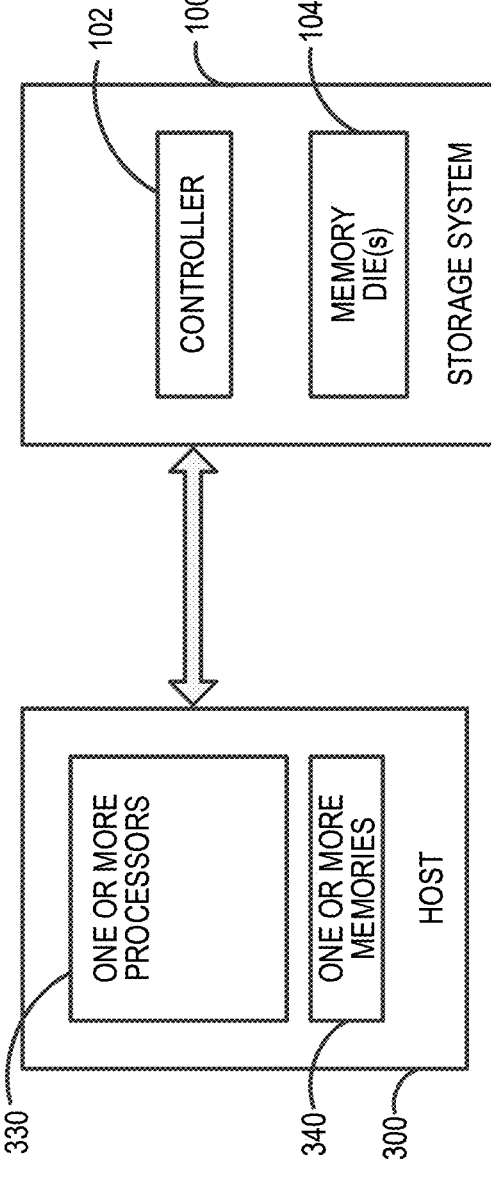
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

The data storage device 100 and host 300 can operate under any suitable specification. For example, the Non-Volatile Memory Express (NVMe) specification provides a paired submission and completion queue mechanism. Commands are placed by host software into the submission queue, and completions are placed into an associated completion queue by the controller 102 of the data storage device 100. In operation, the host 300 writes a command to the submission queue and then writes to a submission queue doorbell register in the data storage device 100 to alert the data storage device 100 to the fact that the host 300 has queued a command in the submission queue. Once alerted, the controller 102 of the data storage device 100 fetches and executes the command from the submission queue. Also, a data storage device operating under the NVMe specification can serve as a multiple physical function NVMe device (MFND), which is a single port NVMe device (e.g., connecting to a single host) that has more than one PCIe physical function. The one or more processors 330 in the host 300 can execute computer-readable program code to provide, for example but not limited to, a hypervisor, a root partition, and a plurality of virtual machines (VMs). Also, the controller 102 in the data storage device 100 can provide a plurality of physical functions (PFs).

Also, a single-root input/output virtualization (SR-IOV) interface is an extension to the Peripheral Component Interconnect Express (PCIe) specification and allows a device, such as a network adapter, separate access to its resources among various PCIe hardware functions. The SR-IOV interface allows a PCIe device to appear to be multiple PCIe devices and introduces the concept of physical functions (PF) (full-featured PCIe functions) and virtual functions (VFs) ("lightweight" functions that lack some configuration resources). A system using an SR-IOV interface can comprise, for example, a root complex, CPU core(s), a hypervisor with multiple physical functions (PF), and multiple virtual machines (VMs), each with multiple virtual functions (VFs).

As mentioned above, an SR-IOV access control feature is based on a namespace, and virtual function attachment is done to a namespace. A namespace refers to a collection of logical block addresses (LBAs) accessible to host software, and a namespace ID (NSID) is an identifier used to provide access to a namespace. Virtual environmental isolation is achieved by namespace, where the administrative virtual machine attaches a virtual function to the namespace associated with a virtual machine. A virtual machine can read and write to the logical space assigned at the time of creating the namespace, and the number of virtual functions represents the support required to operate given a number of virtual machines operating in parallel. For example, an ecosystem can have 50 virtual machines, but the data storage device 100 may only support five virtual functions. In parallel, only five virtual machines can operate, and the administrative virtual machine keeps switching virtual machines to virtual function mapping based on virtual function availability.

However, some environments do not fit well with using a namespace. For example, in a gaming ecosystem, a game download is done by the administrative virtual machine, which can access the entire storage space in the memory 104 of the data storage device 100. Also, the game size can significantly change during game updates. Since an accurate game size may not be predictable for the game's lifetime, changing the namespace size can be challenging. Further, to address the above concerns and optimize storage utilization, the administrative virtual machine can download the game in available logical space and associate it with a stream-ID for a particular game rather than logically devising available space in the namespace.

So, while a gaming console developer may want to utilize SR-IOV for access control based on a stream ID for a given virtual function, it may not want to use a dedicated namespace, limit users to installing games on a particular namespace, or allocate a stream ID to a namespace. Instead, it may be more desirable to have the flexibility to provide access to the entire logical space for the game download and control access based on a stream-ID for a virtual function while the user is playing the game. For gaming downloads, the console developer can use the NVMe stream feature to associate a stream-ID to the game while downloading the game.

The following embodiments can be used to resolve the complexity in the SR-IOV feature and achieve access control for a particular data set based on stream ID to a virtual function. While these embodiments will be described in terms of a game ecosystem, it should be understood that these embodiments can be used in an appropriate application (e.g., automotive). In general, while the size of different applications may vary greatly, access control need not be limited based on namespace. In general, these embodiments control access to stream data without SR-IOV support from the data storage device side using NVMe functionality.

Figure 4:
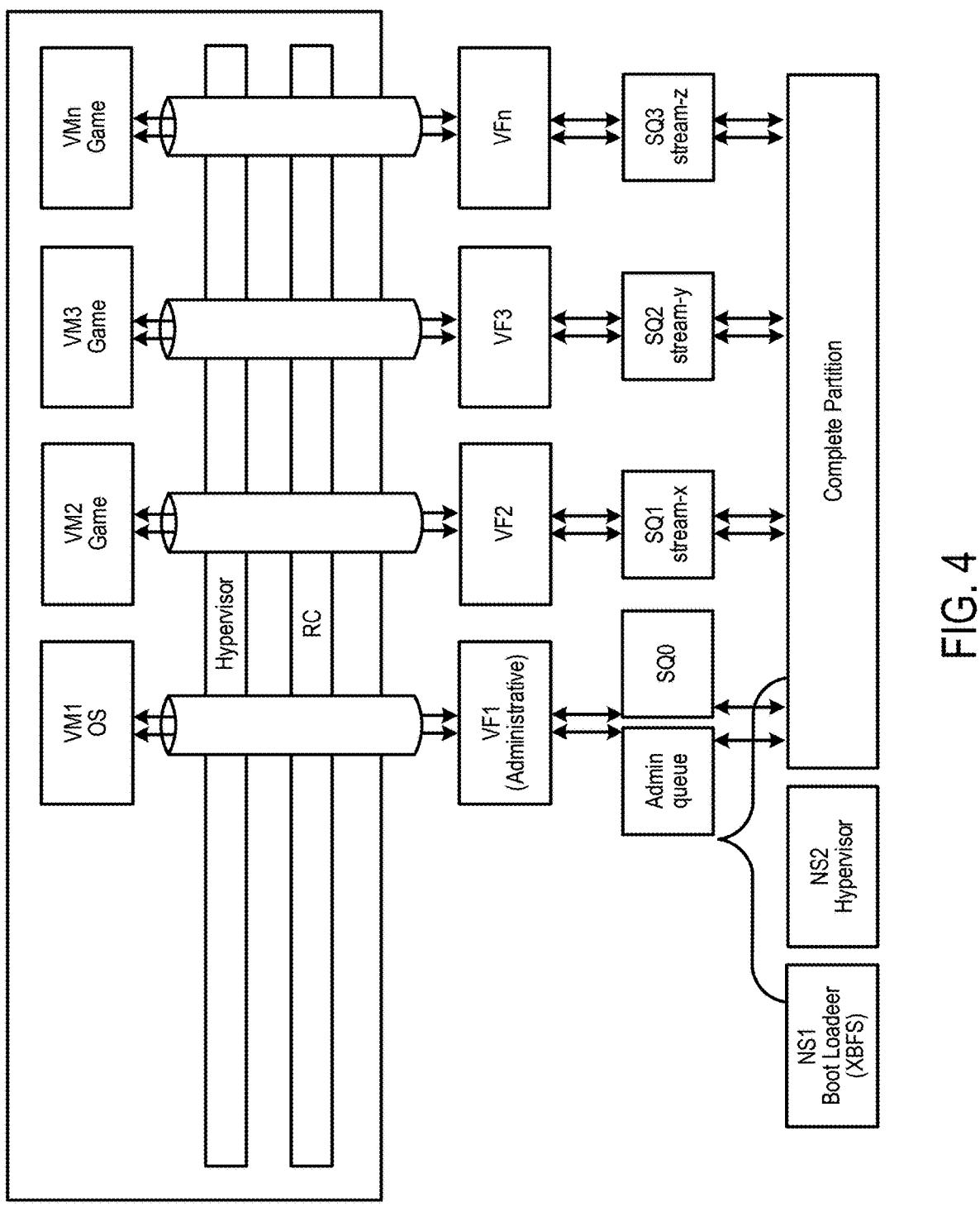
FIG. 4 is an illustration of an architecture of an embodiment.

Turning again to the drawings, FIG. 4 is a block diagram of an architecture of an embodiment. In this embodiment, the administrative virtual function (operation system (OS)) associates the administrative submission queue (SQ) and SQ0. The administrative virtual function provides the operating environment and can access the entire memory space of the data storage device 100. Regarding the virtual functions (VF), VF1 (administrative) associates a submission queue to virtual functions 2 to n. To attach a virtual function, a submission queue is created, the data storage device 100 is informed via an administrative command stream identifier (ID) associated with a given submission queue, and is attached to a desired virtual function. The data storage device 100 can serve only read requests with the given stream ID on submission queue requests. At the time of detaching from the virtual function, the submission queue will be deleted. This embodiment provides better logical space utilization as compared to splitting the logical space to a namespace.

Figure 5:
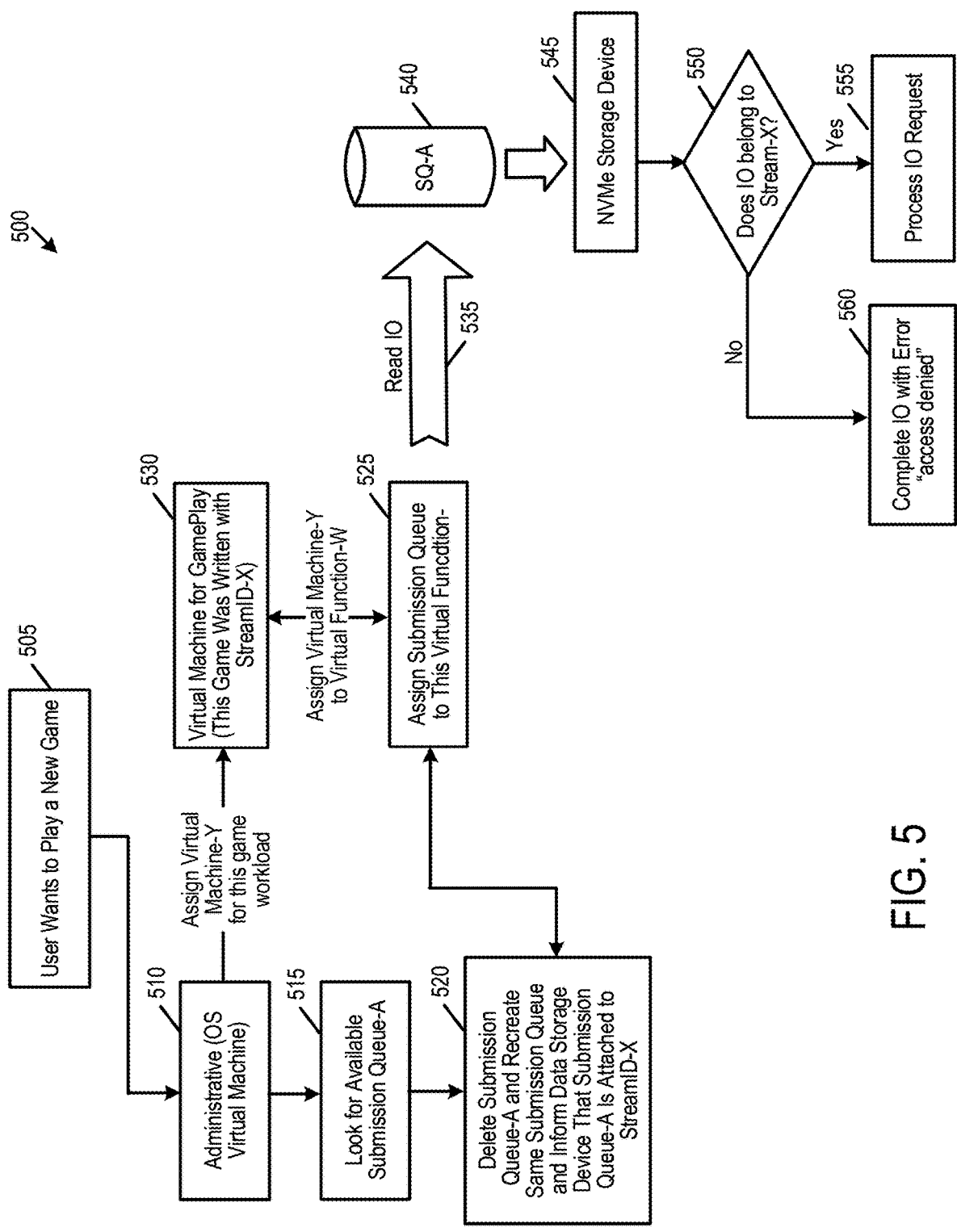
FIG. 5 is a flow chart of an attach method of an embodiment.
Figure 6:
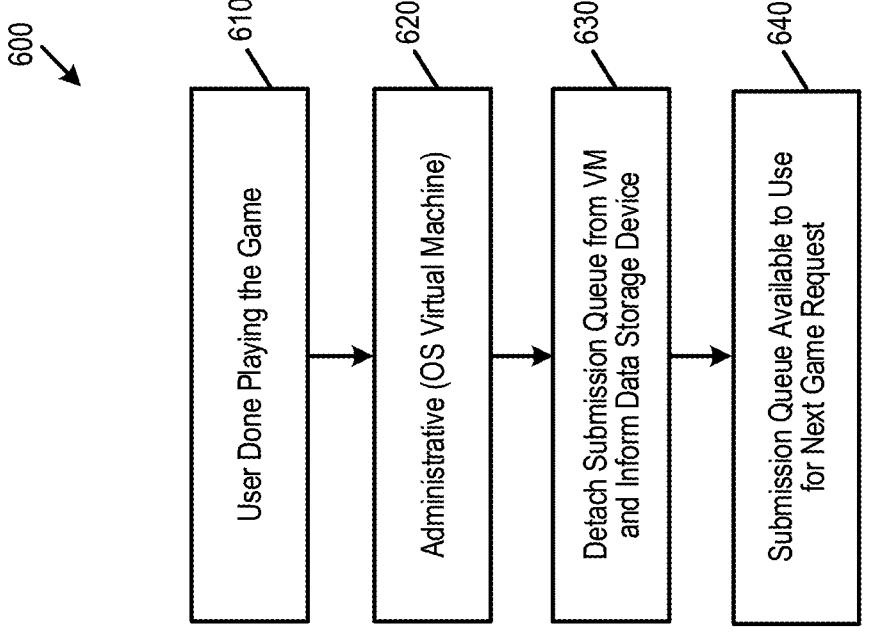
FIG. 6 is a flow chart of a detach method of an embodiment.

FIGS. 5 and 6 illustrate the attach and detach methods in more detail. FIG. 5 is a flow chart 500 of a virtual machine attach method of an embodiment. As shown in FIG. 5, this method starts with a user wanting to play a new game (505). The administrative virtual function (the operating system (OS) virtual machine) (510) looks for available submission queue A (515), and then deletes that submission queue, recreates the same submission queue, and informs the data storage device 100 that submission queue A is attached to StreamID-X (520). The administrative virtual function (the operating system (OS) virtual machine) also assigns virtual machine Y to the game workload to create a virtual machine for the gameplay (the game was written with StreamID-X) (530). Virtual machine Y is assigned to virtual function W, and the submission queue created in 520 is assigned to this virtual function (525). The read ID (535) is then sent to submission queue A (540), which is then accessed by the NVMe storage device (545) (e.g., the data storage device 100). The controller 102 of the data storage device 100 then determines if the input-output (IO) belongs to Stream-X (550). If it does, the IO request is processed (555); otherwise, the IO is completed with an "access denied" error message (560).

FIG. 6 is a flow chart 600 of a virtual machine detach method of an embodiment. As shown in FIG. 6, when the user is done playing the game (610), the administrative function (OS virtual machine) (620) detaches the submission queue from the virtual machine and informs the data storage device 100 (630). The submission queue is then available to use for the next game request (640).

So, in one example in the context of an ecosystem that would like to create a virtual machine environment for user gameplay to access specific game data and achieve a virtual environment, when a user would like to play a specific game, the administrative virtual machine can first check virtual function availability. If there is a lack of availability, the administrative virtual machine may need to wait or detach the non-active virtual machine. The administrative virtual machine then checks for an available submission queue, deletes the submission queue, and recreates the same submission queue. The administrative virtual machine then informs the data storage device 100 of the associated stream ID to this submission queue. The stream ID can be the same as used at the time of game download. The administrative virtual machine then associates this submission queue to the available virtual function and attaches the virtual function to the new game virtual machine that the user would like to play. All input-output from this virtual machine can be submitted in this submission queue. The controller 102 of the data storage device 100 checks all read IOs from this submission queue to see if they are part of associated stream ID or not before processing. If the IO or logical block address (LBA) is not associated with the given stream ID, the controller 102 of the data storage device 100 can fail the IO with a response of invalid access.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory comprising a plurality of logical addresses, wherein a namespace is associated with a subset of the plurality of logical addresses; and
one or more processors, individually or in combination, configured to:
store data outside of the namespace, wherein storage of updates to the data is not limited to the subset of the plurality of logical addresses;
receive notification that a stream identifier associated with the data is attached to a submission queue that was recreated from a deleted available submission queue;
retrieve a read request from the submission queue, wherein the read request was written into the submission queue by a virtual function assigned to the submission queue and assigned to a virtual machine accessing the data;

determine if the read request is associated with the stream identifier;
in response to determining that the read request is associated with the stream identifier, process the read request; and
in response to determining that the read request is not associated with the stream identifier, provide a message indicating that the read request will not be processed.

2. The data storage device of claim 1, wherein assigning the submission queue to the virtual function provides access control without using single-root input/output virtualization (SR-IOV).

3. The data storage device of claim 1, wherein assigning the submission queue to the virtual function provides access control without using the namespace.

4. The data storage device of claim 1, wherein the submission queue was recreated by an administrative virtual machine.

5. The data storage device of claim 1, wherein the one or more processors, individually or in combination, are further configured to receive a notification that the recreated submission queue was detached from the virtual machine.

6. The data storage device of claim 1, wherein the particular stream identifier is associated with a gaming application.

7. The data storage device of claim 1, wherein the stream identifier is associated with an automotive application.

8. The data storage device of claim 1, wherein the one or more processors are part of a controller.

9. The data storage device of claim 1, wherein the memory comprises a three-dimensional memory.

10. A data storage device comprising:
a memory comprising a plurality of logical addresses, wherein a namespace is associated with a subset of the plurality of logical addresses; and
means for:
storing data outside of the namespace, wherein storage of updates to the data is not limited to the subset of the plurality of logical addresses;
receiving notification that a stream identifier associated with the data is attached to a submission queue that was recreated from a deleted available submission queue;
retrieving a read request from the submission queue, wherein the read request was written into the submission queue by a virtual function assigned to the submission queue and assigned to a virtual machine accessing the data;
determining if the read request is associated with the stream identifier;
in response to determining that the read request is associated with the stream identifier, processing the read request; and
in response to determining that the read request is not associated with the stream identifier, providing a message indicating that the read request will not be processed.

11. A method comprising:
performing in a data storage device comprising a memory comprising a plurality of logical addresses, wherein a namespace is associated with a subset of the plurality of logical addresses:
storing data outside of the namespace, wherein storage of updates to the data is not limited to the subset of the plurality of logical addresses;

receiving notification that a stream identifier associated with the data is attached to a submission queue that was recreated from a deleted available submission queue;

retrieving a read request from the submission queue, wherein the read request was written into the submission queue by a virtual function assigned to the submission queue and assigned to a virtual machine accessing the data;

determining if the read request is associated with the stream identifier;

in response to determining that the read request is associated with the stream identifier, processing the read request; and in response to determining that the read request is not associated with the stream identifier, providing a message indicating that the read request will not be processed.

12. The method of claim 11, wherein assigning the submission queue to the virtual function provides access control without using single-root input/output virtualization (SR-IOV).

13. The method of claim 11, wherein assigning the submission queue to the virtual function provides access control without using the namespace.

14. The method of claim 11, wherein the submission queue was recreated by an administrative virtual machine.

15. The method of claim 11, further comprising receiving a notification that the recreated submission queue was detached from the virtual machine.

16. The method of claim 11, wherein the particular stream identifier is associated with a gaming application.

17. The method of claim 11, wherein the particular stream identifier is associated with an automotive application.

18. The method of claim 11, wherein the method is performed in a controller of the data storage device.

19. The method of claim 11, wherein the memory comprises a three-dimensional memory.

* * * * *